United States Patent [19]

Agostini et al.

[11] Patent Number: 5,258,607
[45] Date of Patent: Nov. 2, 1993

[54] ACTIVE ANTI-DAZZLE DEVICE FOR THE DRIVERS OF CARS AND OTHER MOTOR VEHICLES HAVING AN ELECTRO-SENSITIVE SCREEN

[76] Inventors: Alberto Agostini, Via dell'Angelo Custode, 36, Bologna, Italy, 40141; Giorgio Agostini, Via Solferino, 38, Bologna, Italy, 40124; Marco Noli, Via delle Ande, 8, Milano, Italy, 20151

[21] Appl. No.: 923,377
[22] Filed: Jul. 31, 1992
[51] Int. Cl.⁵ .................................. G01J 1/20
[52] U.S. Cl. .................... 250/201.1; 359/230; 359/275
[58] Field of Search ............... 250/201.1, 205, 214 B, 250/214 D; 359/601, 602, 603, 607, 608, 230, 265, 275

[56] References Cited

U.S. PATENT DOCUMENTS

| | | | |
|---|---|---|---|
| 1,518,956 | 12/1924 | Beitman | 359/602 |
| 3,652,149 | 3/1972 | Rogers | 359/275 |
| 3,961,181 | 6/1976 | Golden | 250/208 |
| 4,161,653 | 7/1979 | Bedini et al. | 359/603 |
| 4,719,462 | 1/1988 | Hawkins | 342/20 |
| 4,848,890 | 7/1989 | Horn | 351/44 |

*Primary Examiner*—David C. Nelms
*Assistant Examiner*—Que T. Le
*Attorney, Agent, or Firm*—Darby & Darby

[57] ABSTRACT

An electrical circuit including an optic sensor generating an output sensing signal proportional to a value of a luminosity intercepted in the sensor's field of reception at a specific angle, a measuring/comparing circuit for comparing the output sensing signal with a preset threshold value so as to transmit an actuating signal to a power supply unit of an electro-sensitive screen which responds to the transmission by entering a state of becoming partially darkened or colored. The electro-sensitive screen enters into a state of total transparency when there is no actuating signal transmitted or when the actuating signal ceases its transmission.

7 Claims, 2 Drawing Sheets

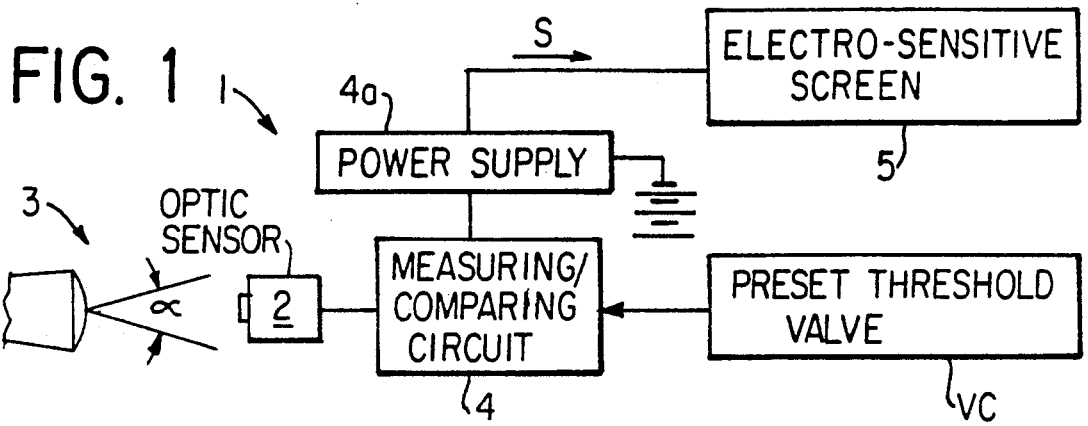
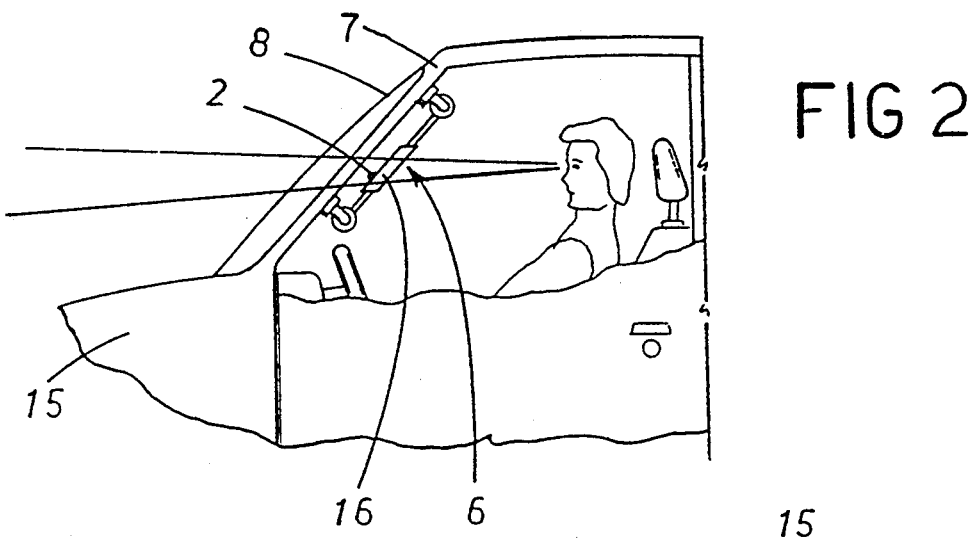
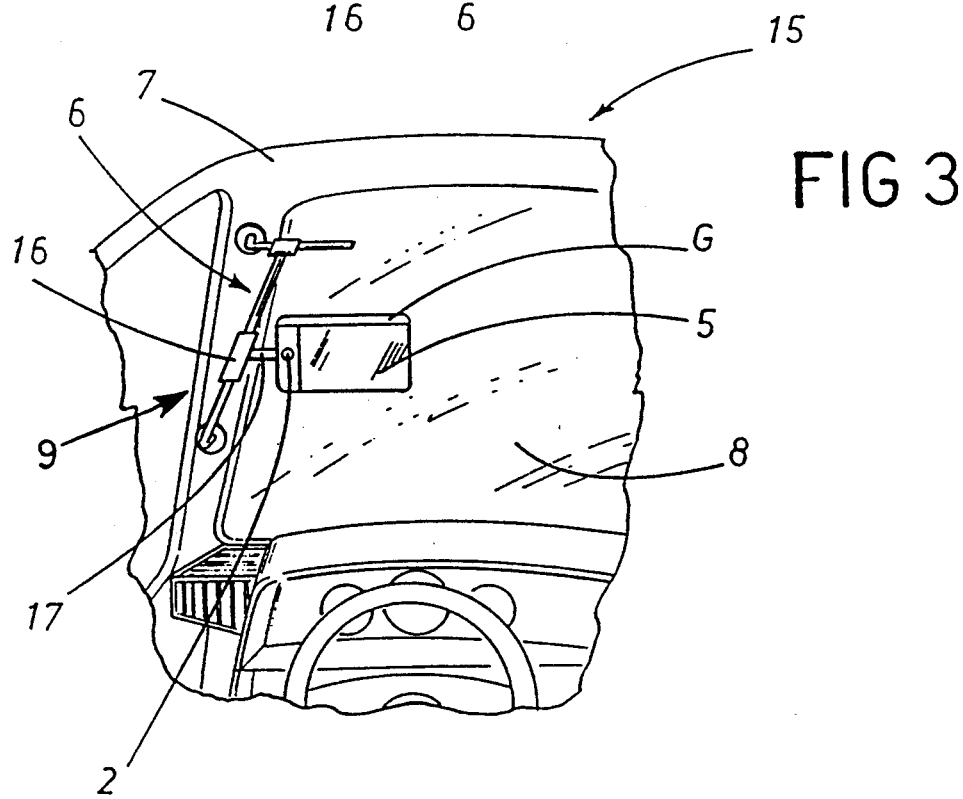

ACTIVE ANTI-DAZZLE DEVICE FOR THE DRIVERS OF CARS AND OTHER MOTOR VEHICLES HAVING AN ELECTRO-SENSITIVE SCREEN

BACKGROUND OF THE INVENTION

This invention is an anti-dazzle device positioned in the field of vision of the driver of a car or other motor vehicle.

It is common when driving on roads or motorways to be dazzled by the rays of the rising or setting sun or, at night, to be dazzled by the headlights of oncoming vehicles.

Dazzle caused by the sun and headlights, is very annoying for a driver (especially when meeting a column of cars coming in the opposite direction or during rain when visibility is reduced and reflections from the road surface are increased) and is also a very serious road traffic hazard which can lead to accidents; dazzle is particularly common on badly lit roads requiring the use of headlights on main beam which are not always dipped by drivers when meeting oncoming traffic.

The aim of this invention is to eliminate the problems caused by dazzle through the use of an anti-dazzle device positioned in the driver's field of vision and which can be actuated, in real time, in the event of dazzle. The invention is cheap to make, practical, structurally simple and adaptable enough to be adjusted in accordance with the driver's height and needs, and the characteristics of the vehicle or accessory on which it is installed.

SUMMARY of the INVENTION

The invention, described in the claims, meets the aforementioned purposes in the form of a device having an electrical circuit consisting of an optic sensor which provides an output sensing signal proportional to the value of the luminosity intercepted in the sensor's field of reception at a specific angle. The sensor output signal is transmitted to a measuring/comparing circuit where it is compared with a preset threshold value; when the signal received exceeds the threshold value, the circuit transmits an output signal which actuates the power supply unit of an electro-sensitive screen. The electro-sensitive screen is designed to pass from a totally transparent state, when there is no actuating signal present, to a partially darkened or coloured state when the actuating signal is received; the screen will pass back to its transparent state again when the actuating signal is no longer transmitted.

BRIEF DESCRIPTION OF THE DRAWINGS

The advantages and characteristics of this invention are described in greater detail below where reference is made to the enclosed drawings which represent one possible form of the invention and are not to be interpreted as being in any way restrictive. The drawings are as follows:

FIG. 1 shows a block diagram of the device described in this invention;

FIGS. 2 and 3 show a side and front view, respectively, of the device in FIG. 1 fitted to a motor vehicle;

DESCRIPTION of the PREFERRED EMBODIMENTS

Figure 5:
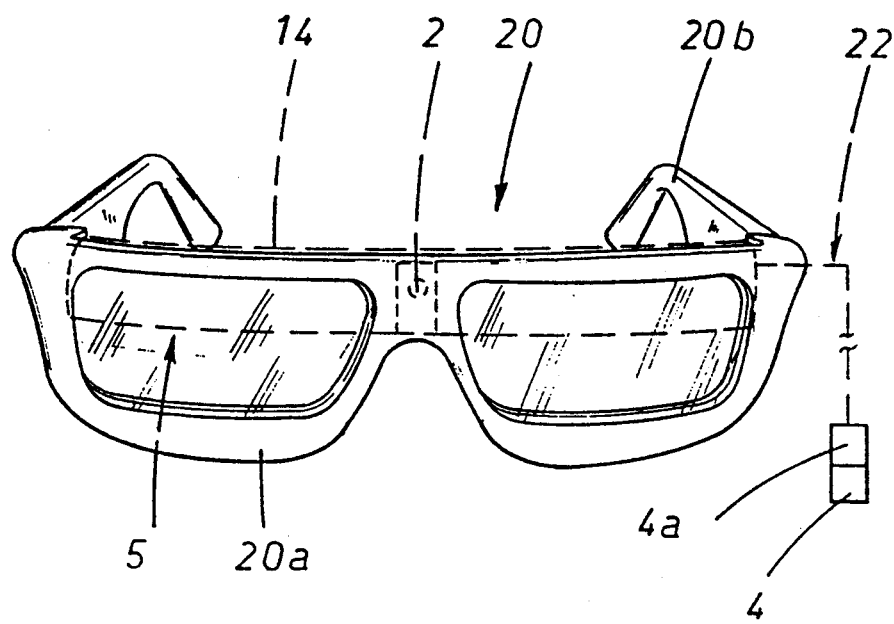
FIG. 5 shows a front view of the device in FIG. 1 fitted to a pair of spectacles.

The anti-dazzle device for the drivers of cars and other motor vehicles covered by this invention consists of a complete electrical circuit 1 (see FIG. 1) comprising an optic sensor 2 providing a sensing output signal (indicated by Ve) proportional to the value of luminosity intercepted in the sensor's field of reception at a specific angle (indicated by $\alpha$) of a beam of light 3 coming from oncoming headlights (on main beam) or the rising/setting sun.

This optic sensor 2 transmits the signal Ve to a measuring/comparing circuit 4 where the signal Ve is compared with a preset threshold value (indicated by Vc in FIG. 1); when the sensed signal Ve exceeds the preset threshold value Vc, the said measuring circuit 4 will output an actuating signal S to the power supply unit 4a (a simple diode, for example) of an electro-sensitive screen 5. This screen 5 is designed to pass from a state of total transparency, when there is no actuating signal S, to a partially darkened or coloured state when the actuating signal S is received; the screen 5 will pass back to its transparent state again when transmission of the actuating signal S ceases.

The electro-sensitive screen 5, as shown here, could consist of a mainly horizontal glass strip, with a liquid crystal layer, positioned between the driver and the source of the beam of light 3.

The optical sensor 2 could be positioned above the glass strip and could be fitted with a guide G to permit adjustment along the glass strip in accordance with the characteristics of the motor vehicle to which it is fitted.

A possible version of the invention is shown in FIGS. 2 and 3 where the electro-sensitive screen 5 pivots at one of its sides on a support 6 fixed to the frame 7 of the motor vehicle 15 at the side the vehicle's windscreen 8 at the same position as the driver's field of vision; between the support 6 and the screen 5 there are means 9 for adjusting the screen 5 so that it can be moved along a minimum of two axes which are at right-angles to each other. The adjustment means 9 consist of a sleeve 16, fitted over a support 6, which rotates on its vertical axis and which can be fitted with a stop screw or other friction device (not shown here) to hold it in position; the sleeve 16 is joined to the screen 5 by a horizontal arm 17 (preferably telescopic) so as to permit horizontal and vertical adjustment of the screen to meet the driver's requirements.

Figure 4:
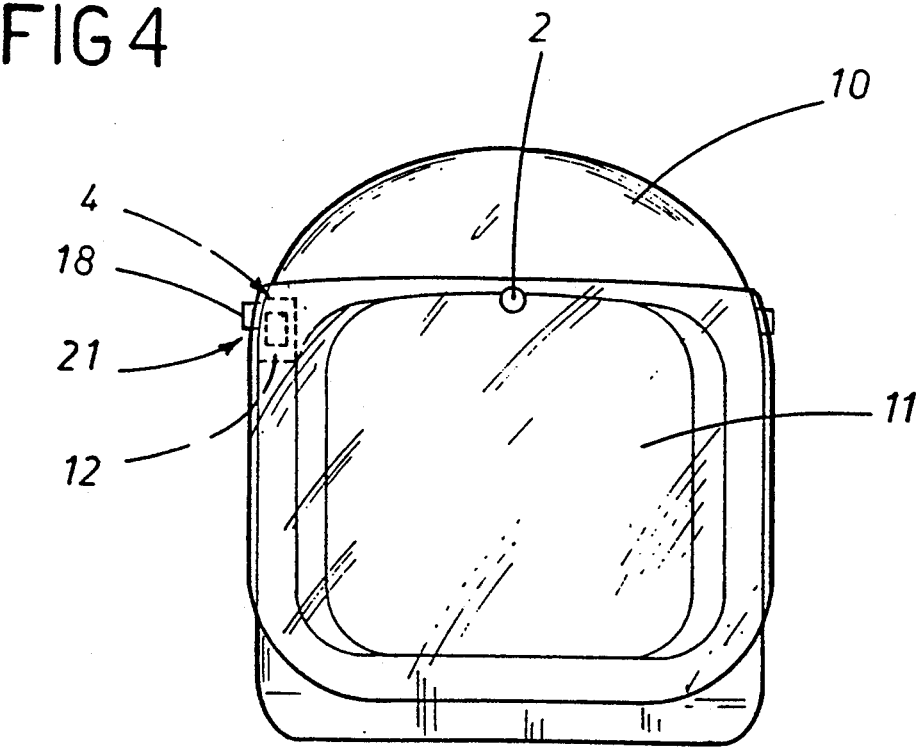
FIG. 4 shows a front view of the device in FIG. 1 fitted to a full-face crash-helmet.

A variant of the screen 5 is shown in FIG. 4 attached to a crash-helmet 10 (preferably the full-face type) where a transparent visor 11 protecting the driver's eyes pivots at its edges on pivot buttons 18; in this case the electro-sensitive screen 5 consists of a pair of the strips 13, as already described, fixed to the visor 11. These strips 13 cover all the left part and part of the right part of the visor 11; the upper centre part of the visor 11 (i.e. on the vertical centre line of the driver's face) is fitted with the optic sensor 2.

The optic sensor 2 and the screen 5 are connected to the measuring/comparing circuit 4 and to the diode 4a by electrical connections 21 consisting of sliding contacts at the pivot buttons 18 holding the edges of the visor 11. The circuit 4 and the diode 4a should preferably be housed in a pocket 12 made in the side padding of the crash-helmet 10 in order to facilitate removal for recharging and maintenance.

A further variant of the device is shown in FIG. 5. In this case the device is mounted on a pair of spectacles 20 and consists of a pair of strips 14 (making up the screen 5) fitted to the frame 20a of the spectacles 20 over the lenses. The optic sensor 2 could be mounted on the bridge between the two lenses and could be connected to the measuring/comparing circuit (preferably not mounted on the spectacles) by electrical connections 22 (e.g. electrical wires) running along the side-pieces 20b of the spectacle frame.

The operation of the device made to the design described above is simple (and is the same for all the variants described here). The screen is placed in front of the driver's eyes (during night driving). If a motor vehicle is illuminated by the main beam headlights of an oncoming vehicle, the beams of light are intercepted by the optic sensor which transmits a sensing signal to the measuring/comparing circuit. If the value of the sensing signal exceeds the threshold value, the circuit will transmit an actuating signal to the power supply unit for the screen so that the screen is partially darkened or coloured thus preventing dazzle in the driver's field of vision.

When the light detected by the sensor falls below the preset threshold, the control circuit interrupts screen actuation and the screen returns to its original, totally transparent, condition.

It would also be possible to incorporate the electro-sensitive screen 5 into the windscreen 8 of the motor vehicle or at least into that part of the windscreen which is directly in front of the driver. It would also be possible to hinge the screen on its support so that it could be rotated and moved out of the way when not in use.

The above description clearly shows that the device fully meets the purposes for which it was designed. It should also be noted that the time taken for the screen to darken is considerably less than the time taken for the human eye to react and adapt to dazzle. When the screen is in use the eye's pupils do not therefore have to work so hard and there is a consequent reduction in eye strain during night driving.

A further possible improvement would be to fit the circuit of the device with solar batteries.

This invention can be subject to numerous modifications and variations, all of which enter within the terms of the invention. All the details of this invention can be substituted by their technical equivalents.

What is claimed;

1. An active anti-dazzle device useful for drivers of cars and other motor vehicles, comprising:
   an electro-sensitive screen positioned between a driver and an on-coming beam of light, said electro-sensitive screen being composed of a liquid crystal glass strip,
   power supply means for supplying power to said electro-sensitive screen;
   an optical sensor having a field of reception at a specific angle and being responsive to luminosity intercepted in the field of reception at the specific angle for generating a sensing signal output proportional to a value of the luminosity intercepted;
   means for comparing the sensing signal output with a threshold value and for transmitting an actuating signal to said power supply means in response to the sensing signal output exceeding the threshold value and for ceasing transmission of said actuating signal in response to the sensing signal output being beneath the threshold value, said power supply means being responsive to receipt of said actuating signal for causing said electro-sensitive screen to leave a sate of total transparency to enter into a partially darkened or colored state, said power supply means being responsive to an absence of said actuating signal, as results in response to said comparing means ceasing the transmission, for restoring said electro-sensitive screen to the state of total transparency;
   means for pivoting said electro-sensitive screen at least on one side with respect to a support fitted to a frame at a side of a motor vehicle's windscreen within a driver's field of vision, the support supporting the electro-sensitive screen on the frame; and
   means for adjusting said screen so that the screen is movable along a minimum of two axes which are at right angles to each other, said screen being fitted with the optic sensor, said pivoting means including an elongated sleeve rotatable about an axis and an extendable arm.

2. A device as in claim 1 wherein the said electro-sensitive screen consists of a liquid crystal glass strip.

3. A device as in claim 1 wherein said electro-sensitive screen is incorporated into a motor vehicle's windscreen at least in that part of the windscreen directly in front of the driver.

4. An active anti-dazzle device useful for drivers of cars and other motor vehicles, comprising:
   an electro-sensitive screen positioned between a driver and an on-coming beam of light;
   power supply means for supplying power to said electro-sensitive screen;
   an optical sensor having a field of reception at a specific angle and being responsive to luminosity intercepted in the field of reception at the specific angle for generating a sensing signal output proportional to a value of the luminosity intercepted;
   means for comparing the sensing signal output with a threshold value and for transmitting an actuating signal to said power supply means in response to the sensing signal output exceeding the threshold value and for ceasing transmission of said actuating signal in response to the sensing signal output being beneath the threshold value, said power supply means being responsive to receipt of said actuating signal for causing said electro-sensitive screen to leave a state of total transparency to enter into a partially darkened or colored state, said power supply means being responsive to an absence of said actuating signal, as results in response to said comparing means ceasing the transmission, for restoring said electro-sensitive screen to the state of total transparency;
   a crash-helmet having an eye-protection visor whose edges pivot on buttons fitted to the crash-helmet, wherein said electro-sensitive screen includes at least one strip fitted to at least one side of said eye-protection visor, said visor having an upper center part fitted with said optic sensor; and
   means for electrically connecting said optic sensor and said screen to said comparing means, said comparing means being housed within a pocket inside said crash-helmet.

5. A device as in claim 3 wherein the said connecting means consist of sliding contacts fitted to at least one pivot button of the said visor.

6. A device as in claim 3 wherein said crash-helmet is fitted with at least two glass strips in the area of the driver's eyes.

7. An active anti-dazzle device useful for drivers of cars and other motor vehicles, comprising:
- an electro-sensitive screen positioned between a driver and an on-coming beam of light;
- power supply means for supplying power to said electro-sensitive screen;
- an optical sensor having a field of reception at a specific angle and being responsive to luminosity intercepted in the field of reception at the specific angle for generating a sensing signal output proportional to a value of the luminosity intercepted;
- means for comparing the sensing signal output with a threshold value and for transmitting an actuating signal to said power supply means in response to the sensing signal output exceeding the threshold value and for ceasing transmission of said actuating signal in response to the sensing signal output being beneath the threshold value, said power supply means being responsive to receipt of said actuating signal for causing said electro-sensitive screen to leave a state of total transparency to enter into a partially darkened or colored state, said power supply means being responsive to an absence of said actuating signal, as results in response to said comparing means ceasing the transmission, for restoring said electro-sensitive screen to the state of total transparency; and
- a pair of spectacles that have lenses and a frame with a central bridge and side pieces, said electro-sensitive screen including of a pair of strips mounted on the frame covering the lenses, the central bridge being fitted with said optic sensor which, together with said screen, is connected to said comparing means by connections located on the side-pieces.

* * * * *